United States Patent [19]

Traylor

[11] Patent Number: 5,473,756
[45] Date of Patent: Dec. 5, 1995

[54] FIFO BUFFER WITH FULL/EMPTY DETECTION BY COMPARING RESPECTIVE REGISTERS IN READ AND WRITE CIRCULAR SHIFT REGISTERS

[75] Inventor: Roger L. Traylor, Hillsboro, Oreg.

[73] Assignee: Intel Corporation, Santa Clara, Calif.

[21] Appl. No.: 998,942

[22] Filed: Dec. 30, 1992

[51] Int. Cl.$^6$ ............................... G06F 12/00; G11C 7/00
[52] U.S. Cl. ............................. 395/250; 365/73; 365/78; 365/189.12; 365/221; 364/239.6; 364/259.2; 364/933.7; 364/DIG. 2; 395/877; 395/427
[58] Field of Search ............................... 365/73, 78, 221, 365/230.05, 189.04, 189.12; 395/250, 425

[56] References Cited

U.S. PATENT DOCUMENTS

| | | | |
|---|---|---|---|
| 4,888,739 | 12/1989 | Frederick et al. | 365/221 |
| 5,255,220 | 10/1993 | Filliman | 365/189.04 |
| 5,274,600 | 12/1993 | Ward et al. | 365/221 |
| 5,305,253 | 4/1994 | Ward | 365/73 |
| 5,345,419 | 9/1994 | Fenstermaker et al. | 365/189.04 |

*Primary Examiner*—Ken S. Kim
*Attorney, Agent, or Firm*—Blakely, Sokoloff, Taylor & Zafman

[57] ABSTRACT

A method and apparatus for generating control signals for a high speed First In First Out (FIFO) buffer. Moreover, the present invention limits the instances where signal glitches may occur. A first pair of circular shift registers are used to control writing data to and reading data from the FIFO. The outputs of each register in each shift register are coupled to enable individual read and write lines of a FIFO memory device. A single logical one value circulates through the shift registers to indicate a FIFO location where data may be written to or from. Toggle latches are coupled to each shift register. The values in the toggle registers change responsive to a read or write operation. By comparing the logical one values in the corresponding positions in the shift registers, and considering the values from the toggle latches, EMPTY and FULL conditions are detected. Further, ALMOST EMPTY and ALMOST FULL signals are generated through a second pair of circular shift registers which shadow the operation of the first pair of circular shift registers. The second pair of circular shift registers is preset with one or more logical one values. By comparing the logical one values in the corresponding positions of the first and second pairs of shift registers, the ALMOST EMPTY and ALMOST FULL conditions are detected.

21 Claims, 10 Drawing Sheets

| WRITE CLOCK CYCLE | WC1 324 | WC2 235 | WC3 326 | WT 328 | READ CLOCK CYCLE | RC1 321 | RC2 322 | RC3 323 | RT 327 | FLAG 311a | $\overline{\text{FLAG}}$ 311b | EMPTY 317 | FULL 318 |
|---|---|---|---|---|---|---|---|---|---|---|---|---|---|
| RESET | 0 | 0 | 1 | 0 | RESET | 0 | 0 | 1 | 0 | 0 | 1 | 1 | 0 |
| 1 | 1 | 0 | 0 | 1 | - | 0 | 0 | 1 | 0 | 1 | 0 | 0 | 0 |
| 2 | 0 | 1 | 0 | 0 | - | 0 | 0 | 1 | 0 | 1 | 0 | 0 | 0 |
| 3 | 0 | 0 | 1 | 1 | - | 0 | 0 | 1 | 0 | 0 | 1 | 0 | 1 |
| - | 0 | 0 | 1 | 1 | 1 | 1 | 0 | 0 | 0 | 1 | 0 | 0 | 0 |
| - | 0 | 0 | 1 | 1 | 2 | 0 | 1 | 0 | 0 | 1 | 0 | 0 | 0 |
| - | 0 | 0 | 1 | 1 | 3 | 0 | 0 | 1 | 1 | 0 | 1 | 1 | 0 |

FIG. 4

FIFO BUFFER WITH FULL/EMPTY DETECTION BY COMPARING RESPECTIVE REGISTERS IN READ AND WRITE CIRCULAR SHIFT REGISTERS

BACKGROUND OF THE INVENTION

1. Field of the Invention

The present invention relates to the field of computer systems, in particular, the buffering of data in a high speed multi-computer network.

2. Prior Art

In a high speed multi-computer network, data often is transmitted at a much higher rate than it can be consumed. To facilitate high transfer rates between computing nodes, high speed buffers are used. A high speed buffer is typically a First In First Out (FIFO) device through which data that is inserted first, is output first. The functional operating characteristics of FIFO devices is well known. Generally, a FIFO is comprised of a memory device, e.g. a Static Random Access Memory (SRAM), and FIFO controller. The memory device is the media into which data is written and read. A FIFO controller manages the writing and reading of data into the FIFO and provides status and control signals to devices coupled to the FIFO.

When used in a high speed network, a gating factor is the decoding of FIFO pointers for identifying locations in the FIFO where elements are read from or written to. A technique for avoiding the decoding of FIFO pointers is described in an article entitled "Design and Implementation of High-Speed Asynchronous Communication Ports for VLSI Multicomputer Nodes", Yuval Tamir and Jae C. Cho, published in the Proceedings of the 1988 International Symposium on Circuits and Systems Espoo, Finland, June 1988 (TAMIR). TAMIR describes using shift registers to select successive bytes during packet reception and transmission.

Another aspect of FIFO control that affects performance is the generation of control and flag signals. In known systems, the FIFO pointers must be decoded in order to derive the signals. Two FIFO control signals typically provided are EMPTY and FULL. The EMPTY signal is used to indicate that the FIFO has no entries. When an EMPTY signal is asserted, a device connected to the FIFO will know that there is nothing to read from the FIFO. The FULL signal is used to indicate that the FIFO cannot accept further entries. When a FULL signal is asserted, a device connected to the FIFO will know not to attempt to write to the FIFO. Attempts to read from an empty FIFO or write to a full FIFO often result in error conditions.

For a FIFO device operating in a high speed environment, two other signals are typically provided—ALMOST EMPTY and ALMOST FULL. As data transfers in such high speed environments is often in a "burst mode", there may not be time for a device to respond to an EMPTY or FULL signal. Thus, the ALMOST EMPTY and ALMOST FULL signals provide advanced warning to connected device of potential error conditions.

Known techniques for generating control signals require the decoding of FIFO pointers. The FIFO pointers are used to indicate locations in the FIFO, such as top and bottom of the FIFO. The top of the FIFO would identify the next item to be read. The bottom of the FIFO would indicate the location in the FIFO into which data will next be written. The decoding of such FIFO pointers is time consuming and potentially detrimental to the performance of the network.

Further, known techniques for generating flag signals for an asynchronous FIFO are not glitch free. A glitch is a term of art that refers to a signal that under certain conditions, is too short to be detected or does not reach a true logical value. For example, a glitch may occur on an ALMOST EMPTY signal of a FIFO when it is almost empty, and a write operation is immediately followed by a read operation. Under such circumstances, the ALMOST EMPTY signal may not reach a state indicating that the FIFO that is not ALMOST EMPTY. This may provide improper state information to devices utilizing the FIFO signals.

It would be desirable to generate FIFO control signals without decoding FIFO pointers and to eliminate instances where a signal glitch may occur.

SUMMARY

A method and apparatus for generating control and flag signals for a First In First Out (FIFO) buffer directly on a read or write cycle, is disclosed. A first pair of circular shift registers are used to control writing data to and reading data from the FIFO. The outputs of each register in each shift register are coupled to enable individual read and write lines of a FIFO memory device. A single logical one value circulates through the shift registers to indicate a FIFO location where data may be written to or from. Toggle latches are coupled to each shift register. The values in the toggle registers change responsive to a read or write operation. The toggle latches indicate whether a boundary condition has been crossed an even or odd number of times.

By comparing the logical one values in the corresponding positions in the shift registers, and considering the values from the toggle latches, EMPTY and FULL conditions are detected. Further, ALMOST EMPTY and ALMOST FULL signals are generated through a second pair of circular shift registers which shadow the operation of the first pair of circular shift registers. Each of the second pair of circular shift registers is preset with one or more logical one values which are offset from the logical one value in the first pair of circular shift registers. By comparing the logical one values in the corresponding positions of the first and second pairs of shift registers, the ALMOST EMPTY and ALMOST FULL conditions are detected.

Moreover, the present invention limits the instances where signal glitches may occur to the boundary conditions (where a glitch may always occur in a FIFO operating asynchronously.) A boundary condition occurs for a simultaneous read and write (or write and read) operations when the FIFO is in a FULL (or EMPTY) condition. This is accomplished by the direct bit by bit comparison of the contents of the respective shift registers and by eliminating the need to decode FIFO pointers.

BRIEF DESCRIPTION OF THE FIGURES

FIG. 4 is a table of the signals which illustrate the operation of the currently preferred embodiment of the present invention to generate EMPTY and FULL signals.

FIG. 6 is a timing diagram of the generation of an ALMOST FULL signal utilizing the structure of FIG. 5a.

DETAILED DESCRIPTION OF THE PREFERRED EMBODIMENT

A method and apparatus for generating control and flag signals for a First In First Out (FIFO) memory, is described. In the following description, numerous specific details such as FIFO operations, are set forth in order to provide a thorough understanding of the present invention. It will be apparent, however, to one skilled in the art that the present invention may be practiced without such specific details. In other instances, specific implementation details, such as handshaking protocols between sending and receiving devices coupled to a FIFO, have not been shown in detail in order not to unnecessarily obscure the present invention. Finally, various well known devices, e.g. flip-flops and shift registers, are not described in detail. Operation of such devices would be well known to one skilled in the art.

The present invention eliminates the need to decode FIFO pointers. FIFO pointers are used to indicate locations for accessing elements in the FIFO. The currently preferred embodiment of the present invention is implemented for use in a multi-node parallel processing computer system. However, it would be apparent to one skilled in the art to implement the present invention in any system utilizing a FIFO arrangement.

Parallel Processing Computer System of the Currently Preferred Embodiment

Figure 1:
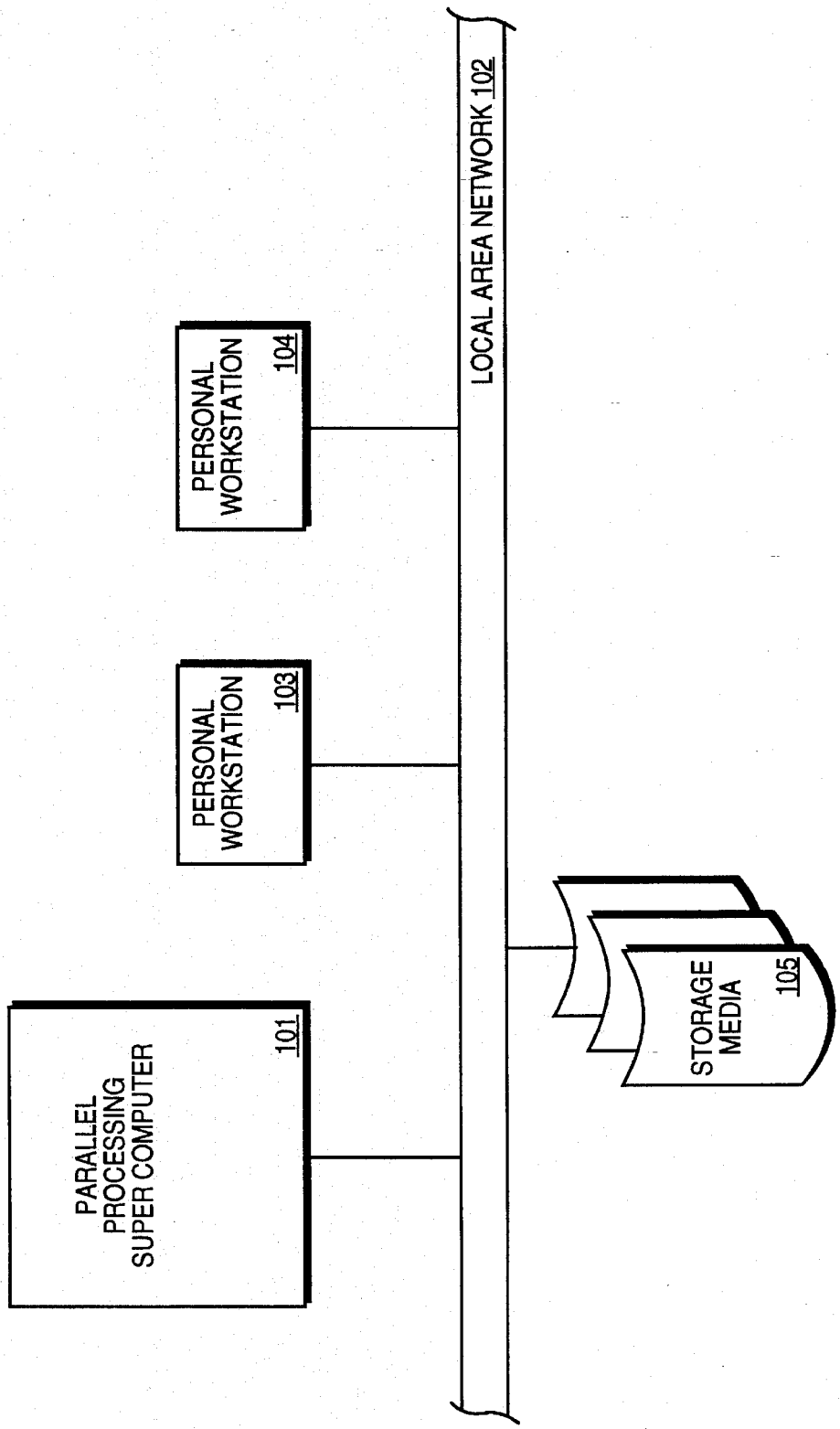
FIG. 1 is a block diagram of a parallel processing computer of the currently preferred embodiment of the present invention may be implemented.

FIG. 1 is a block diagram of a computing environment utilizing a parallel processing super computer as may be utilized in the currently preferred embodiment of the present invention. Referring to FIG. 1 a parallel processing super computer 101 is coupled to a local area network (LAN) 102. Further coupled to local area network 102 are personal workstations 103 and 104 and storage media 105. The parallel processing super computer 101 performs processing services for users on a local area network 102, e.g. users on personal workstations 103 and 104. The personal workstations 103 and 104 may be any one of the members of the family of IBM compatible personal computers or any other commercially available workstation. The storage media 105 contains program data which would execute on the parallel processing super computer 101. The local area network 102 may be one of various known LAN topologies, e.g. ethernet or token ring.

The parallel processing super computer 101 of the currently preferred embodiment is an Intel PARAGON™ processor available from the Intel Corporation of Santa Clara, Calif. A parallel processing super computer such as the PARAGON™ is made up of a plurality of a independent computing nodes that are networked together.

The processor nodes of a parallel processor are comprised of a routing element and a processing element. The routing element is used to couple the various processing elements according to a network topology. The processing element is comprised of a processor and a Network Interface Chip (NIC) component. The processor may be a general purpose microprocessor, e.g. the Intel486™ family of microprocessors, or a specifically designed microprocessor, e.g. the i860 and i960 processors, all of which are available from the Intel Corporation of Santa Clara, Calif. The NIC component is used to couple the processing element to the routing element. The NIC component provides transmission rate buffering for incoming and outgoing messages to and from the processor. The NIC also translates synchronous to asynchronous signaling conventions. Here, the synchronous based signaling conventions are utilized by the processor, whereas the network operates in an asynchronous or self-timed scheme.

Figure 2:
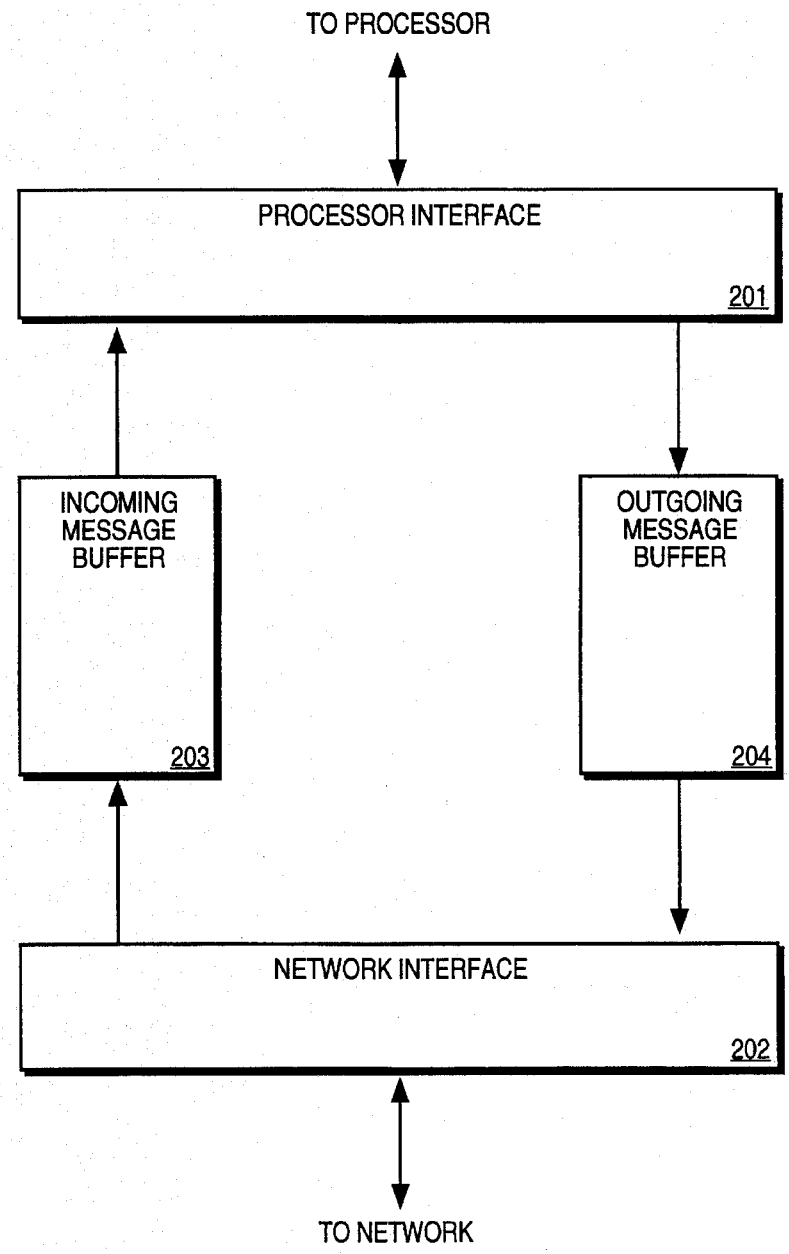
FIG. 2 is a block diagram of a Network Interface Chip for buffering data between a processor and network in which the currently preferred embodiment of the present invention may be implemented.

FIG. 2 is a functional block diagram of the NIC component. As described above, the NIC provides an interface between the processor and the network. A key function is the buffering of incoming and outgoing messages. This is accomplished in incoming message buffer 203 and outgoing message buffer 204. The incoming message buffer 203 buffers messages from the network to the processor. The outgoing message buffer 204 buffers messages from the processor to the network. Each of the buffers 203 and 204 include a First In First Out (FIFO) structure for holding the data. Each of the buffers 203 and 204 are further coupled to processor interface 201 and network interface 202. The processor interface 201 is used to transmit messages using a synchronous protocol of the processor. The network interface 202 is used to transmit and receive messages using the asynchronous protocol of the network.

FIFO Structure of the Currently Preferred Embodiment

Figure 3A:
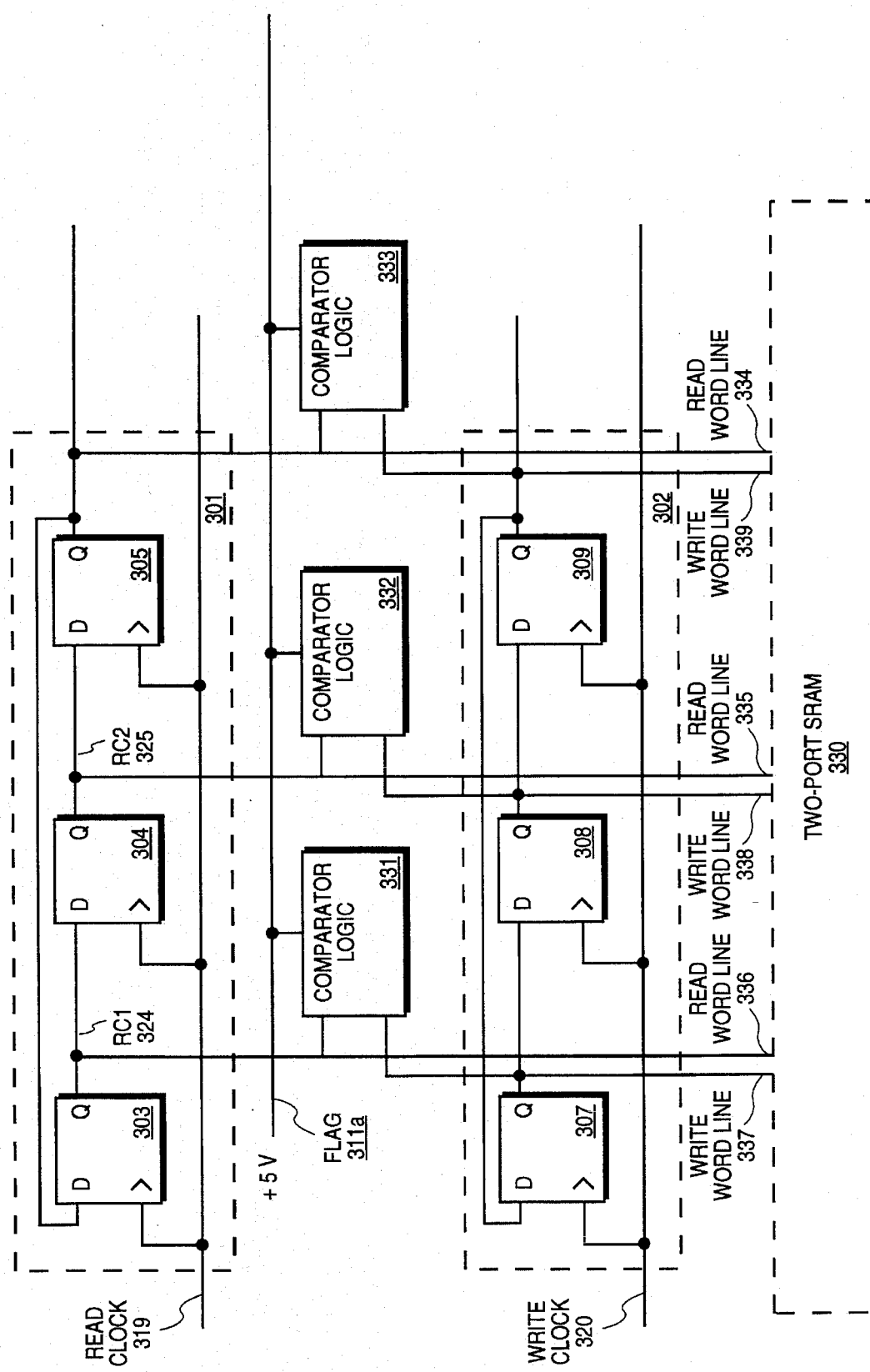
FIG. 3a is a block diagram of the FIFO structure for writing and reading to the FIFO as utilized in the currently preferred embodiment of the present invention.
Figure 3B:
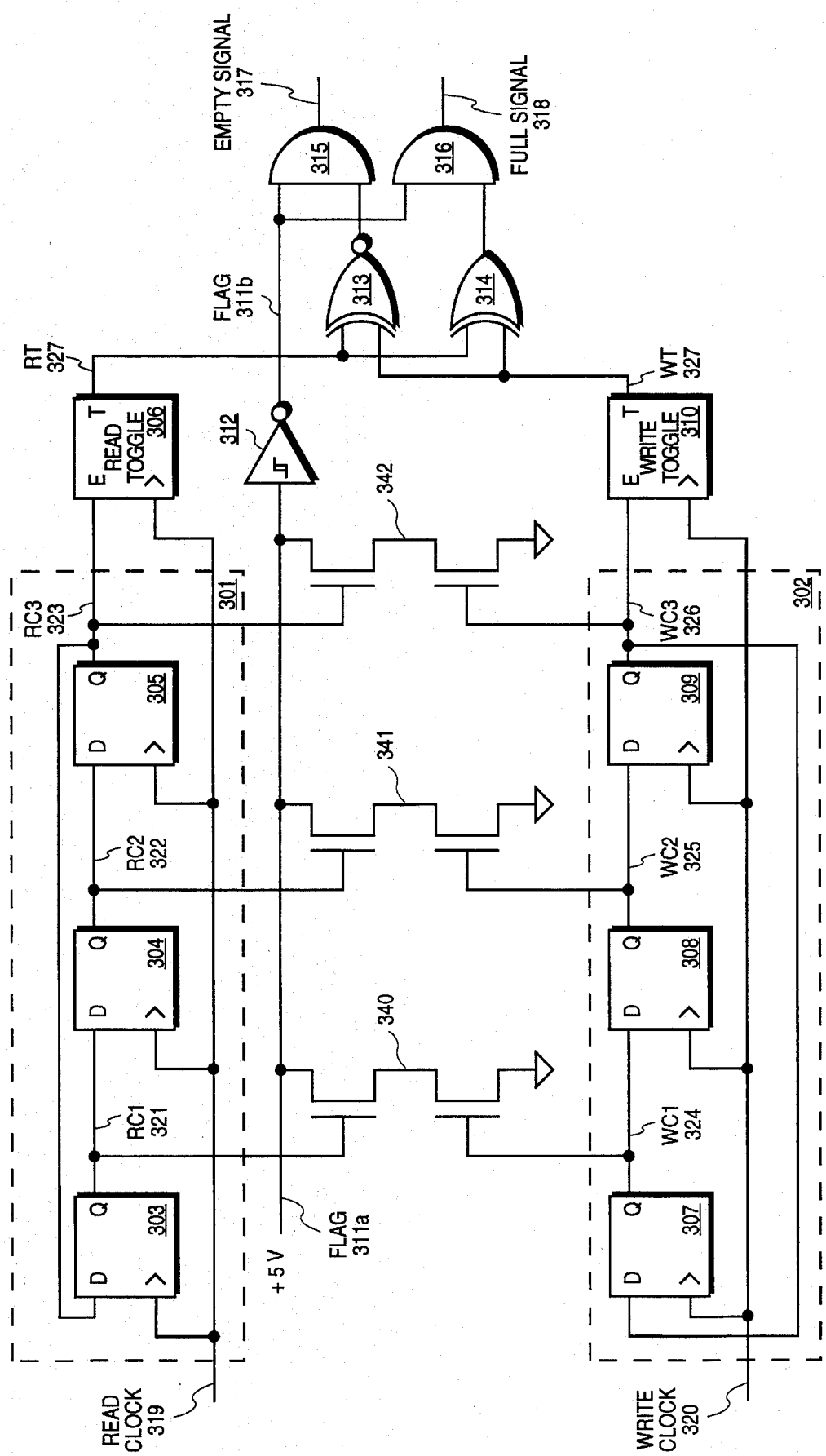
FIG. 3b is a block diagram of the FIFO structure for generating EMPTY and FULL signals as utilized in the currently preferred embodiment of the present invention may be implemented.

As described above, the NIC component comprises separate FIFO Buffers for messages being transmitted to and from the processor and the network. The structure for each FIFO is identical. FIGS. 3a and 3b are block diagram which describe the FIFO of the present invention. FIG. 3a is used to describe writing data to and from the FIFO (i.e. access control). FIG. 3b is used to describe generation of the control and flag signals.

Access Control of the FIFO

The FIFO of FIGS. 3a and 3b is a three (3) element FIFO. In the currently preferred embodiment, the FIFO contains 2048 elements. Referring to FIG. 3a, a read counter 301 and a write counter 302 are coupled to a two-port Static Random Access Memory (SRAM) 330. The SRAM 330 is the memory device which stores data in the FIFO. An SRAM is used as the memory device due to the speed in which data in the SRAM may be accessed. The dual ports of SRAM 330 provide for concurrent reading and writing. The circular shift registers 301 and 302 are used to control the reading and writing of entries into the FIFO, respectively. The read shift register 301 is comprised of registers 303–305. The outputs of each of the registers 303–305 is coupled to a corresponding read word line (334–336) of the SRAM 330. In the currently preferred embodiment, each of registers 303–305 and 307–309 are a rising edge triggered DQ flip-flop. The read word lines allow the data on that line to be read out of the FIFO. Similarly, the write shift register 302 is comprised of registers 307–309. The outputs of each of the registers 307–309 is coupled to a corresponding write word line (337–339) of the SRAM 330. The write word lines allow data to be written into the FIFO.

The read shift register 301 is clocked by read clock 319 while the write shift register 302 is clocked by the write clock 320. To illustrate the operation of the FIFO, assume that the FIFO has been reset. When reset, the FIFO is empty, and a logical one will appear at output of the last register in the respective shift registers, namely, registers 305 and 309. The reason for this will become more apparent below in the description of the generation of the flag and control logic signals. The values output from the remainder of the registers will be a logical zero. When a first element is to be written to the FIFO, the write clock will cycle, causing the one value to be clocked into the first register of the write shift register 302, i.e. register 307. The data in the meantime will have been written into the storage location of the previously enabled write word line, e.g. write word line 339.

Similarly, if a read was to next occur, the read would occur at the enabled read word line, e.g. read word line 334. The logical one value would then propagate to the first register in the read shift register 301, i.e. register 305.

In this manner, it can be observed that the read shift register 301 will always designate the FIFO element that is at the "top" of the FIFO. Conversely, the write shift register will designate the FIFO element that is the "bottom" of the FIFO. From this, whenever the read and write shift registers both refer to the same FIFO element, a boundary condition has occurred. Namely the FIFO is either full or empty.

Finally, FIG. 3a illustrates a flag 311a and comparator logic blocks 331–333. These elements are used for generating FULL and EMPTY control signals. These elements are described in more detail with respect to FIG. 3b.

Generation of the EMPTY and FULL Signals

Generation of the EMPTY and FULL signals makes further use of the read and write shift registers. EMPTY and FULL signals are used to avoid reading from an empty FIFO or writing to a full FIFO. As described above, single logical one (1) circulates around the read and write shift registers as data is written to and read from the FIFO. As noted above, when the corresponding registers of the read and write shift registers both have a logical one, a boundary (empty or full) condition has occurred. What is now described is the means by which a boundary condition is detected, and further how the two boundary conditions are distinguished. Referring to FIG. 3b, a flag line 311a is coupled to N-channel transistors 340–342. The flag line 311a is coupled to a resistive +5 Volt source in older to maintain a logic one value on the flag line 311a during times when a false comparison condition exists. The flag line 311a is further coupled to a Schmitt trigger inverter 312 to created an inverted flag signal 311b. The Schmitt trigger inverter 312 provides hysteresis so that any time overlap between adjacent register output changes may be masked. This provides a margin of safety for minimizing glitches on inverted flag signal 311b.

Each of the N-channel transistors 340–342 are coupled to the corresponding outputs of the registers of the read and write shift registers. For example, the output of registers 303 and 307 are coupled to N-channel transistor 321. The effect that this has is that if a logical one value occurs at both the outputs of the registers 303 and 307, the flag line 311a will be driven to ground, i.e. a logic zero. Similarly, the flag line 311a may be driven to ground by any of the N-channel transistors 340–342. Note that if the flag line 311a has a logical zero value, the Schmitt trigger inverter 312 will cause the inverted flag 311b to rise to a logical one value. Thus, whenever the corresponding registers of the shift registers 301 and 302 both have a logical one value, a logical one will appear at the inverted flag 311b.

The inverted flag 311b is further coupled to AND gates 315 and 316. The AND gate 315 is used to drive EMPTY signal 317. The AND gate 316 is used to drive FULL signal 318.

In order to distinguish between the boundary conditions, toggle registers and other logic gates are utilized. The toggle registers are coupled to the clock signals to cause alternating one and zero logic values to be generated. In any event, read toggle 306 is driven by read clock 319 to generate Read Toggle (RT) signal 327. Similarly, write toggle 310 is driven by write clock 320 to generate Write Toggle (WT) signal 328. The RT signal 327 and WT signal 328 indicate whether the EMPTY/FULL boundary conditions have been passed an even or odd number of times. Each toggle 306 and 310 is coupled to not exclusive OR gate 313 and exclusive OR gate 314. The not exclusive OR gate 313 is coupled to AND gate 315 (to create EMPTY signal 317) while exclusive OR gate 314 is coupled to AND gate 316 (to create FULL signal 318).

Generally, the EMPTY signal 317 will be asserted when the inverted flag 311b is asserted and both RT signal 327 and WT signal 328 are either asserted or not asserted. The FULL signal 318 will be asserted when the inverted flag 311b is asserted and one and only one of the RT signal 327 WT signal 328 is asserted.

Finally, it should be noted that the output of registers 303–305 are denoted as RC1 321, RC2, 322 and RC3 232, respectively. The output of registers 307–309 are denoted as WC1 324, WC2 325 and WC3 326.

The generation of the signals is further described with reference to FIG. 4. FIG. 4 is a table which indicates the logical values at the output locations described above with reference to FIG. 3b for the reset state, followed by three (3) consecutive write operations that are immediately followed by three (3) consecutive read operations. In the reset state, logical ones are at the WC3 326, RC3 323, inverted flag 311b and EMPTY 317 outputs. Significant is the indication that the FIFO is empty.

On the first write clock cycle, the logical one value in the write shift register circulates to the first register so that the output WC1 324 has the logical one value. Further, the write toggle WT 328 takes on a logical one value. The FLAG 311a takes on a logical one value, which causes the EMPTY signal to become de-asserted to a logical zero value.

For the next write cycle the signals remain the same, except that the logical one value is shifted to WC2 325 and the WT 328 value is toggled to a logical zero value. At the third write cycle, the FIFO is full. Here, a logical one value occurs at corresponding registers so that WC3 326 and RC3 323 cause Flag 311a to take a logical zero value. Because inverted flag 311b and WT 328 now have logical one values and RT 327 has a logical zero value, FULL 318 is asserted.

On the first read cycle, the logical one shift value circulates to the first register in the shift register so that RC1 321 now has a logical one value. As the logical one value is no longer at corresponding registers and RT 327 now toggles to a logical one value, the FULL 318 is de-asserted to a logical zero value. On the second read cycle, the logical one shifts to the second register so that RC2 takes on the logical value. As before RT 327 toggles to a logical zero value. Finally, on the third read cycle, the FIFO becomes empty. This is driven by corresponding registers, namely WC3 326 and RC3 323, and WT 328 and RT 327 all having logical one values. Thus, EMPTY 317 is again asserted to a logical one value.

In the currently preferred embodiment of the present invention, the elimination of encoding and decoding of FIFO pointers along with the direct bit by bit comparison of the output of the shift registers minimizes glitches. Glitches may still occur on the boundary conditions (simultaneous read/write operations during an existing FULL or EMPTY condition) under totally asynchronous usage. However, such glitches during the boundary conditions cannot be avoided. As will become apparent, this glitch free operation equally applies to the generation of the ALMOST EMPTY and ALMOST FULL signals.

Generation of the ALMOST EMPTY and ALMOST FULL Signals

In high speed data transfers, receipt of an EMPTY or FULL signal may not be recognized and processed in a time frame to prevent writing to a FIFO that is full or reading from a FIFO that is empty. Thus, it is desirable to provide some advanced warning that these conditions are likely to arise. This early warning comes in the form of ALMOST EMPTY and ALMOST FULL signals. Generation of the ALMOST EMPTY and ALMOST FULL signals is similar to the generation of the EMPTY and FULL signals. In the case of the ALMOST FULL signal, the output of the write shift register is compared to the output of a shift register that is analogous to the read shift register. However, in this case the logical one value is offset from the value in the actual read shift register. Moreover, multiple logical one values may be encoded into the offset read shift register. In a similar fashion, the ALMOST EMPTY signal, the output of the read shift register is compared to a programmable write offset shift register.

By convention, an ALMOST FULL signal is asserted whenever FULL is asserted and ALMOST EMPTY is asserted whenever EMPTY is asserted. As will be described in more detail below, the final generation of the ALMOST FULL and ALMOST EMPTY signals will include assertion in the event that the FULL or EMPTY signals, respectively, are asserted. However, it should be noted that in the currently preferred embodiment of the present invention, the generation of the ALMOST EMPTY and ALMOST FULL signals are not limited to using the EMPTY or FULL signal generation described herein. Any means for generating EMPTY or FULL signals may be utilized.

Figure 5A:
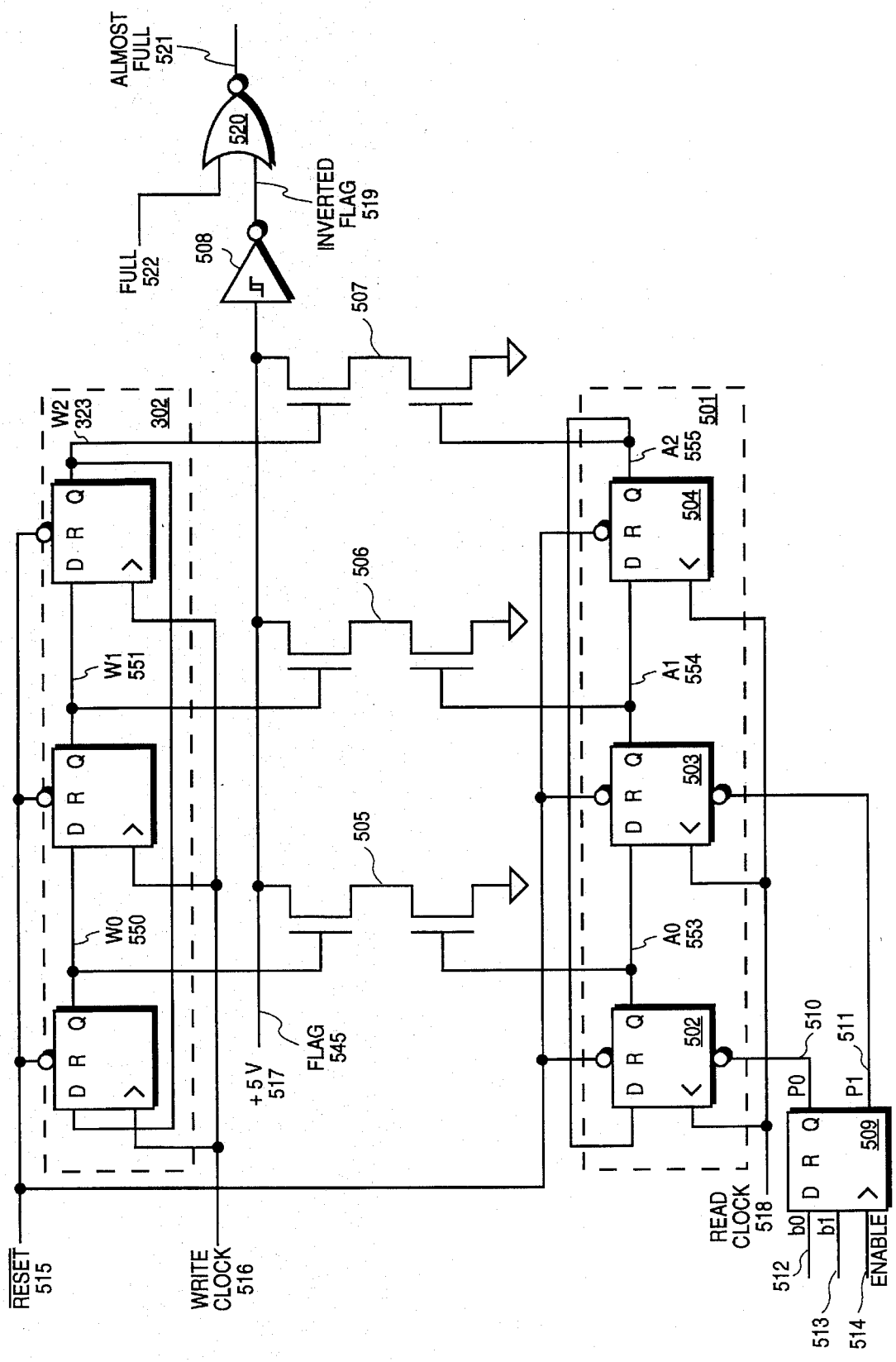
FIG. 5a is a block diagram illustrating the structure for generating an ALMOST FULL signal, as utilized in the currently preferred embodiment of the present invention.

FIG. 5a is a block diagram of the circuit for generating an almost full signal. The outputs of a write shift register 302 are compared to the outputs of a read offset shift register 501. As described above, the write shift register 302 will contain one logical one value which is circulated through the registers in the shift registers. The read offset shift register 501 may contain one or more contiguous logical one values within its registers. The logical one values are inserted into the registers 502, 503, and 504 via encoder 509. The encoder 509 has outputs P0 510 and P1 511. The encoder is driven by inputs P0 512 and B1 513. The encoder is enabled by enable signal 514. Similar to the circuitry described with reference to FIG. 3a and 3b, a flag line 518 which is driven to a logical one value by a resistive +5 volts source 517 is coupled to a plurality of N-Channel transistors, 505–507. Each of the N-Channel transistors 505 through 507 is coupled to the output of a pair of corresponding registers of the write shift register 302 and the read offset shift register 501. As before, whenever a logical one value appears at the output of corresponding pairs of registers, the flag line 518 will be driven to a logical zero value. The flag line 518 is further coupled to a Schmitt trigger inverter 508 to create inverted flag signal 519. Thus, when a pair of logical one values appears at corresponding register outputs, the inverted flag 519 will contain a logical one value. If no logical one values appear in corresponding register pairs, the inverted flag 519 will have the logical zero value. The inverted flag 519 is coupled to OR gate 520. The OR gate 520 has as a further input a FULL signal 522. As noted above, the full signal 522 may be generated by the means described above with reference to FIG. 3a and 3b or by any other means. Finally, the output of the OR gate 520 is the ALMOST FULL signal 521.

Finally, a reset signal is provided to each of the registers of the shift registers 302 and 501, in order to reset the FIFO. Also note that the write shift register 302 is driven by the write clock 516 and the read offset shift register 501 is driven by the read clock 518.

Figure 5B:
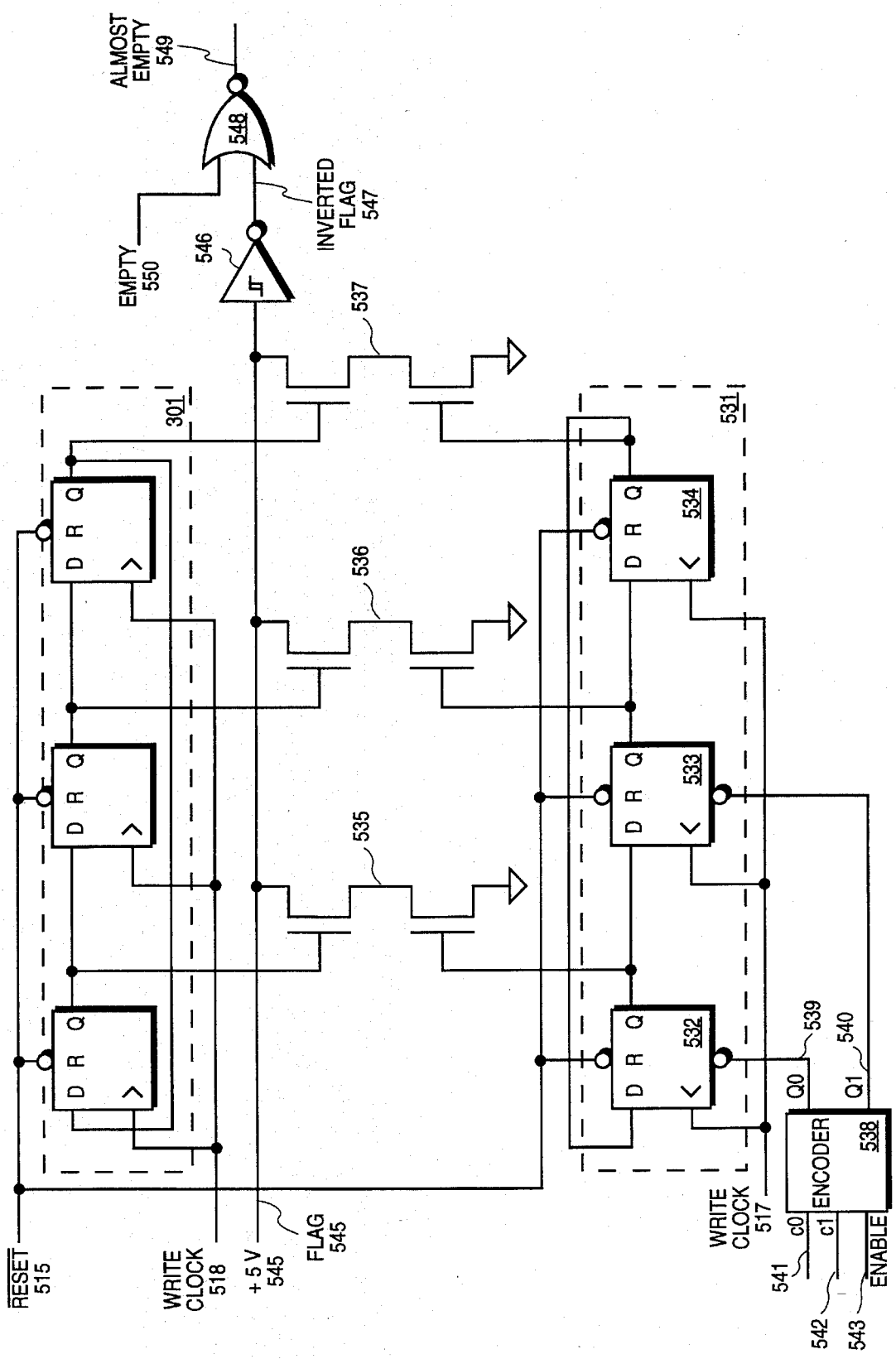
FIG. 5b is a block diagram illustrating the structure for generating an ALMOST EMPTY signal, as utilized in the currently preferred embodiment of the present invention.

FIG. 5b is a block diagram which illustrates generation of the ALMOST EMPTY signal. The circuitry for generating the ALMOST EMPTY signal is nearly identical to that for generating the ALMOST FULL signal described above with referenced to FIG. 5a. In any event, the outputs of the read shift register 301 of FIG. 3a is compared to the output of write offset shift register 531. The read shift register 301 is driven by read clock 518 while the write offset shift register 531 is driven by write clock 517. N-Channel transistors 535–537 are coupled to pairs of outputs of the read shift register 301 and the write offset register 531. The N-Channel transistors 535–537 are further coupled to a flag line 545. The flag line 545 is driven high by resistive source 544 and is further coupled to Schmitt trigger inverter 546 to create inverted flag signal 547. The inverted flag 547 is coupled to an OR gate 548. Also coupled to the OR gate 548 is EMPTY signal 550. The output of the OR gate 548 is the ALMOST EMPTY signal 549. The setting of logical one values in the write offset shift register 531 is accomplished through encoder 538. The encoder 538 has output Q0 539 which is coupled to register 532 and output Q1 540 which is coupled to programmable input of register 533. The encoder 538 has as inputs C0 541 and C1 542. An enable signal 543 causes the encoder to be enabled. Finally, reset signal 515 is used to clear the shift register elements when the FIFO is reset.

Figure 6:
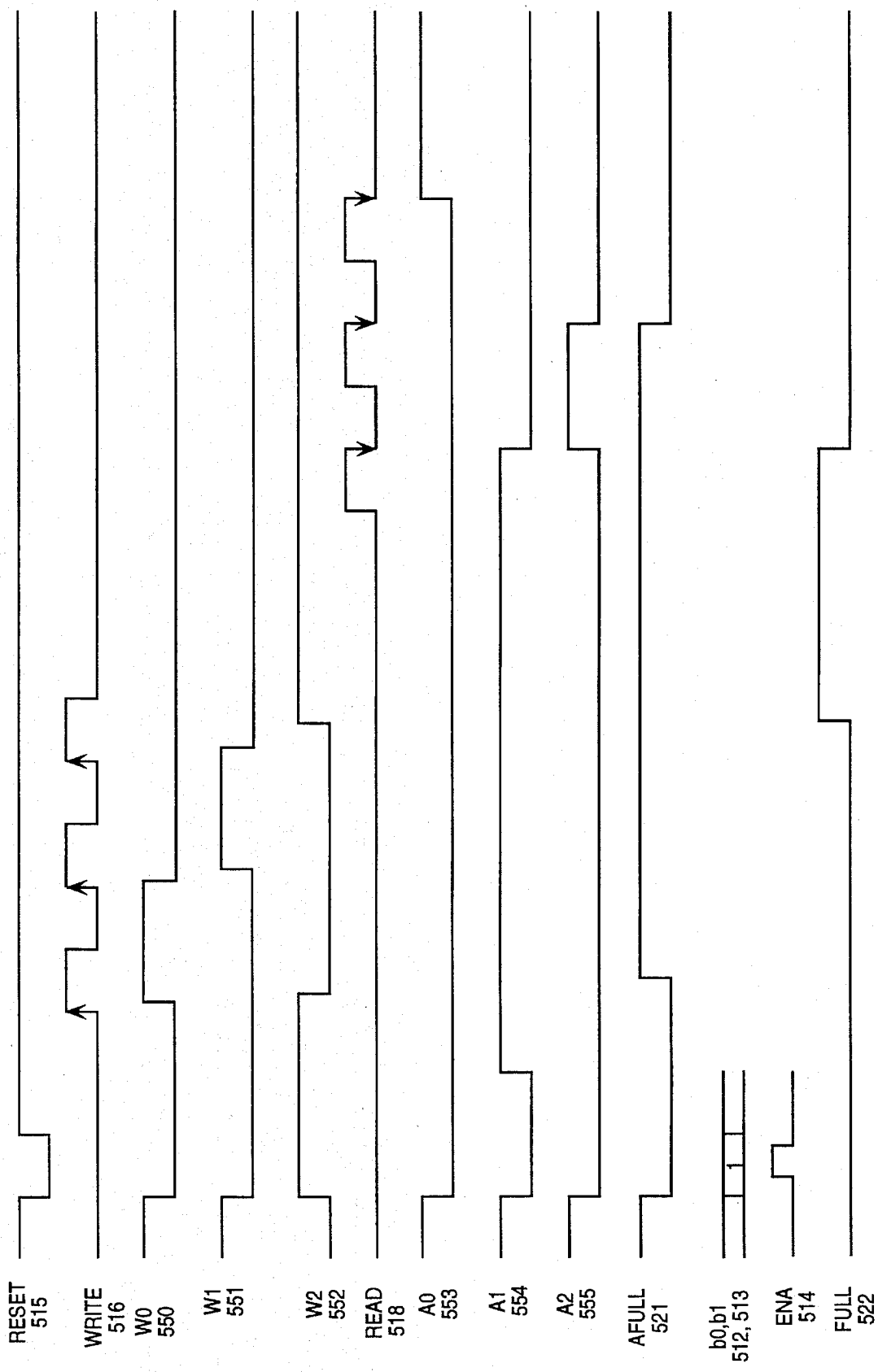

FIG. 6 is a timing diagram which illustrates the operation of generating the ALMOST FULL signal of FIG. 5a. Referring briefly to FIG. 5a, various register outputs signals are indicated, namely W0 550, W1 551, W2 552, A0 553, A1 554 and A2 555. The reset signal 515 causes a logical one value to appear at W2 552. The output W2 552 corresponds to the output of the last register of the write shift register 302. This has the further effect of causing each of the outputs of the read offset shift register 501, A0 553, A1 554, and A2 555 to have logical zero values. At this point the enable signal 514 will cause the encoder 509 to assert the necessary preset input to register 501 to detect an almost full condition. Here, the enable signal causes the output of register 503, i.e., A1 554, to be asserted to a logical one value.

The write clock causes the logical one value to propagate through the registers of the write shift register 302. When the logical one value, is in the second register of write shift register 302, both the signals, W1 551 and A1 554 will have a logical one value. This will cause the ALMOST FULL signal 521 to become asserted. During the next write cycle, the FULL signal will become asserted.

On the first read, the logical one value in the read offset shift register 501 is shifted so that A2 555 now has the logical one value, the FULL signal is de-asserted, and the ALMOST FULL signal remains asserted. After the second read, the ALMOST FULL signal becomes de-asserted, because no two pairs of registers both have a logical one value, and again the logical one value in the read offset shift register shifts. Although not described in detail, at this point the ALMOST EMPTY signal would be asserted.

Alternative Embodiment

An alternative embodiment of the present invention generates the EMPTY, FULL, ALMOST EMPTY and ALMOST FULL control signals according to standard industry conventions. These conventions are:

1. EMPTY and ALMOST EMPTY are asserted on the rising edge of a read cycle.
2. EMPTY and ALMOST EMPTY are de-asserted on the falling edge of a write cycle.
3. FULL and ALMOST FULL are asserted on the rising edge of a write cycle.
4. FULL and ALMOST FULL are de-asserted on the falling edge of a read cycle.

Figure 7:
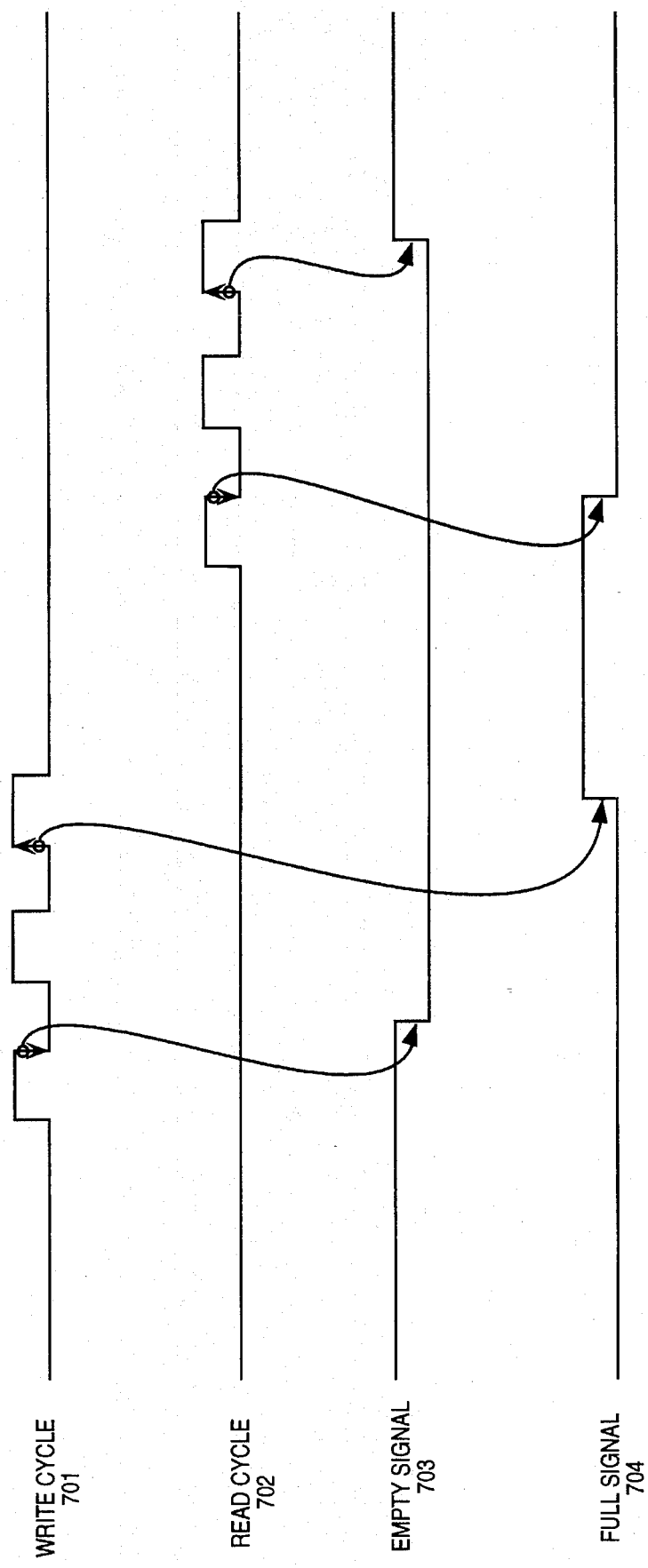
FIG. 7 is a timing diagram for generating FULL, ALMOST FULL, EMPTY and ALMOST EMPTY signals that are in conformance with industry standards.

This is further illustrated with reference to the timing of FIG. 7. Referring to FIG. 7, a write clock 701, read clock 702, an EMPTY signal, 703 and a FULL signal 704 are illustrated. On the falling edge of a cycle of write clock 701, the EMPTY signal 703 becomes de-asserted (see timing pointer 705). The EMPTY signal 703 is again asserted on the rising edge of a cycle of read clock 702 (see timing pointer 706). With respect to FULL signal 704, it is asserted on the rising edge of a cycle of write clock 701 (see timing pointer 707), and de-asserted on a falling edge of read clock 702 (see timing pointer 708).

Figure 8:
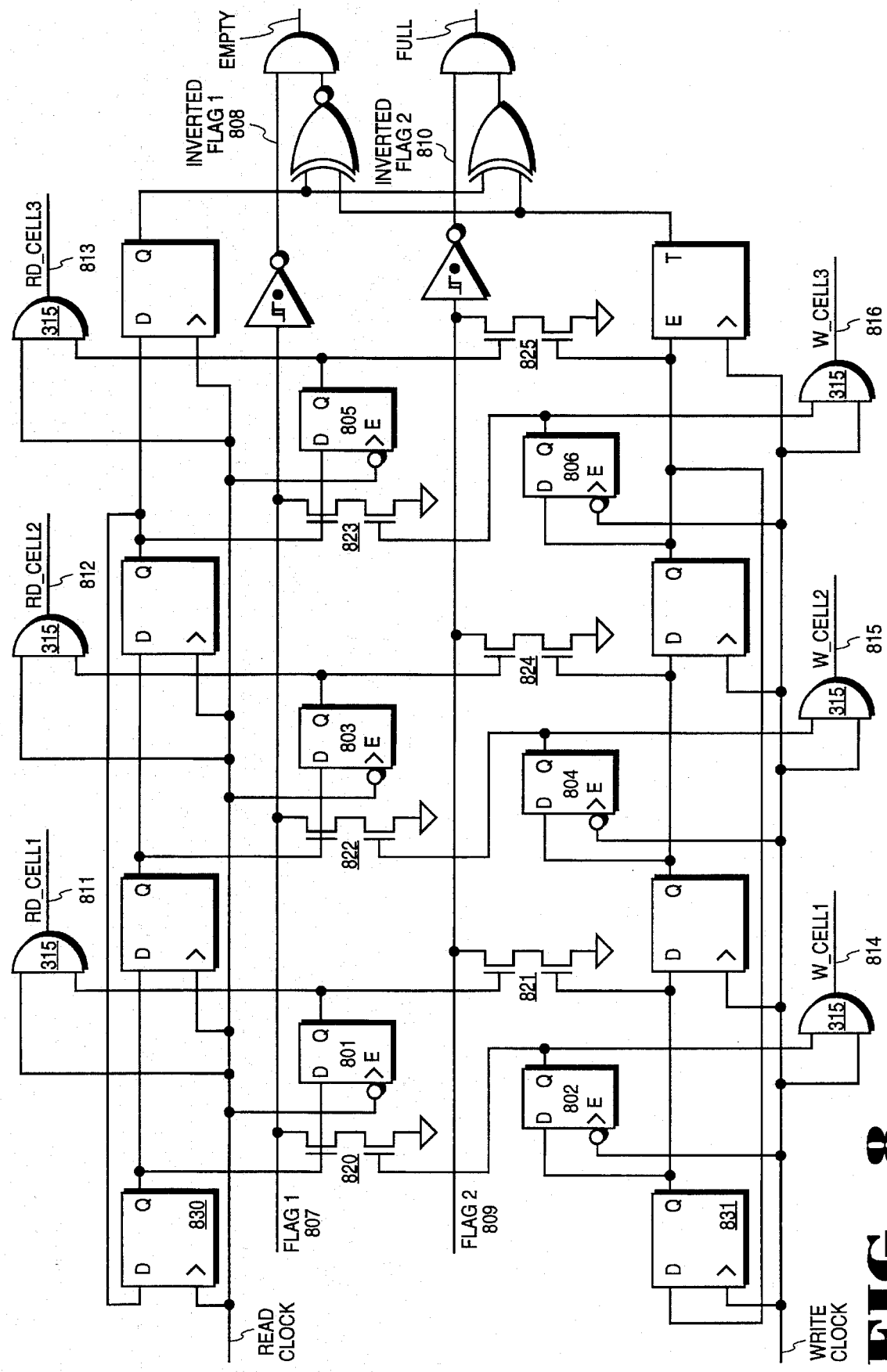
FIG. 8 is a block diagram of an alternative embodiment of the structure of the present invention for generating FULL and EMPTY signals which conform to industry standards.

In order to generate the signals according to these industry conventions, further circuitry is added. Such circuitry is illustrated in FIG. 8. One of the differences is the use of separate flag lines, here flag1 807 and flag2 809 which individually control the generation of the EMPTY and FULL signals. This allows the generation of the signals upon the proper edge of the respective read or write cycle. Coupled to flag1 807 are N-Channel transistors 820, 822 and 823. Coupled to flag2 are N-Channel transistors 821, 824 and 825. Each of the N-Channel transistors provides a means by which the flag1 807 or flag2 808 may be driven low when a pair of registers in the read and write shift registers both have a logical one value.

Each of the N-Channel transistors has as one of it's inputs, the outputs of a latch. For example, the latch 802 is coupled to N-Channel transistor 802. Each latch is clocked by the falling edges of the respective read or write clocks. These latches cause the provision of the signal upon the proper edge of the respective clock signals. For example, assume that an empty condition exists due to read that has occurred. Assume that registers 830 and 831 would both have the logical one value that creates the boundary condition. We know that the EMPTY signal is to be de-asserted on the falling edge of a write cycle. The latch 802 is clocked by the falling edge of the write cycle. Thus, on the falling edge of the write cycle, the N-Channel transistor 820 will draw flag1 807 low, thus causing the EMPTY signal to be de-asserted.

Assuming that the boundary condition is now a full condition, and that the outputs of registers 830 and 831 both have a logical one value, the case for de-asserting the FULL signal is illustrated. The full condition will be de-asserted when a read occurs. When a read cycle occurs, the logical one value will be clocked out of register 830. The N-Channel transistor 821 is coupled to receive the input of latch 801. Latch 801 is clocked by the falling edge of the read cycle. Thus, on the falling edge of the read cycle a logical zero will be provided to N-Channel transistor 821. This will draw flag2 809 low, thus causing the FULL signal to be de-asserted.

Each of the latches and N-Channel transistor pairs operate in the manner described above.

FIG. 8 also illustrates circuitry for enabling reads and write on the falling edge of the respective read and write clocks. Here, each of RD_Cell1 811, RD_Cell 2 812, RD_Cell3 813, W_Cell1 814, W_Cell2 815 and W_Cell3 816 is coupled to an AND gate and the outputs of a corresponding latch. Each of the RD_Cell1 811, RD_Cell 2 812, RD_Cell3 813 is used to enable a read line of a memory device. Similarly, each of W_Cell1 814, W_Cell2 815 and W_Cell3 816 is used to enable a write line of a memory device.

Although not illustrated, the circuitry illustrated in FIG. 8 may also be utilized for generation of the ALMOST EMPTY and ALMOST FULL signals.

While the currently preferred embodiment is implemented to generate both control and flag signals, it would be apparent to one skilled in the art to utilize the present invention to generate flag signals (i.e. EMPTY, FULL, ALMOST EMPTY and ALMOST FULL.) Such implementations would not depart from the spirit and scope of the present invention.

Thus, a method and apparatus for generating control and flag signals for a First In First Out (FIFO) device, is described.

I claim:

1. In a computer system, a buffering device for managing the transfer of data messages between a first device in said computer system and a second device in said computer system, said buffering device comprising:

a) a memory means for storing data messages, said memory means having X locations for storing data messages;

b) a circular read shift register having X register positions, said read shift register for identifying the location in said memory means from which a next data message is to be read;

c) a circular write shift register having X register positions, said write shift register for identifying the location in said memory means into which a next data message is to be written;

d) flag signal generation means coupled to said read shift register and said write shift register, said flag signal generation means for generating a flag signal which indicates whether a boundary condition is occurring in said memory device;

e) a read toggle responsive to a read clock for indicating whether an even or odd number of boundary conditions in said memory device have occurred;

f) a write toggle responsive to a write clock for indicating whether an even or odd number of boundary conditions in said memory device have occurred;

g) full signal generation means coupled to said flag signal generation means, said read toggle and said write toggle, said full signal generation means for generating a signal that said memory means is full; and h) empty signal generation means coupled to said flag signal generation means said read toggle and said write toggle, said empty signal generation means for generating a signal that said memory means is empty.

2. The buffering device as recited in claim 1 wherein said flag signal generation means is further comprised of:

a) means for generating a logical one signal along a common line, said line being common to N-channel means.;

each of said N-Channel means coupled to corresponding outputs of said X registers of said read shift register and said X registers of said write shift register, each of said N-Channel means for converting said common line to a logical zero value if each input to said N-Channel means has a logical one value; and b) signal inversion means for inverting a signal on said common line from a logical one to a logical zero or from a logical zero to a logical one.

3. The buffering device as recited in claim 2 is further comprised of:

a) almost full signal generation means coupled to said full signal generation means and said write shift register, said almost full signal generation means for generating a signal that said memory device is almost full; and b) almost empty signal generation means coupled to said empty generation means and said read shift register, said almost empty signal generation means for generating a signal that said memory device is almost empty.

4. The buffering device as recited in claim 3 wherein said almost full signal generation means is further comprised of:

a) a read offset shift register having X registers, said read offset shift register for tracking read operations from said memory device;

b) means for generating a logical one signal along a common line;

c) N-Channel means, each of said N-Channel means coupled to corresponding outputs of said X registers of said read offset shift register and said X registers of said write shift register, each of said N-Channel means for converting said common line to a logical zero value if each input to said N-Channel means has a logical one value;

d) signal inversion means for inverting a signal on said common line from a logical one to a logical zero or from a logical zero to a logical one; and e) means for providing a logical one value if said full signal or said common line has a logical one value.

5. The buffering device as recited in claim 4 wherein said almost empty signal generation means is further comprised of:

a) a write offset shift register having X registers, said write offset shift register for tracking write operations to said memory device;

b) means for generating a logical one signal along a common line;

c) N-Channel means, each of said N-Channel means coupled to corresponding outputs of said X registers of said write offset shift register and said X registers of said write offset shift register, each of said N-Channel means for converting said common line to a logical zero value if each input to said N-Channel means has a logical one value;

d) signal inversion means for inverting a signal on said common line from a logical one to a logical zero or from a logical zero to a logical one; and e) means for providing a logical one value if said empty signal or said common line has a logical one value.

6. In a computer system, a method for generating empty and full signals for a First In First Out (FIFO) device, said method comprising the steps of:

a) setting a read shift register and a write shift register, each having a plurality of register positions, to have a single logical one value in a corresponding register position;

b) for each write operation to the FIFO, shifting said single logical one value to a next register position and toggling a write toggle value;

c) for each read operation from the FIFO, shifting said logical one value to a next register position and toggling a read toggle value;

d) after each write or read operation, identifying a boundary condition by comparing the corresponding register positions of said read shift register and said write shift register and determining if any corresponding pair of register positions both have a logical one value;

e) asserting said full signal if said boundary condition exists and said read toggle value and write toggle value have a first set of predetermined values; and f) asserting said empty signal if said boundary condition exists and said read toggle value and write toggle value have a second set of predetermined values.

7. The method as recited in claim 6 wherein the first set of predetermined values is that said read toggle has logical one value and said write toggle has a logical zero value or that read toggle value has a logical zero value and said write toggle has a logical one value.

8. The method as recited in claim 7 wherein the second set of predetermined values is that said read toggle and said write toggle both have the same logical values.

9. The method as recited in claim 6 is further comprised of the steps of:

a) setting Y register positions in a read offset shift register having a plurality of register positions to have logical one value starting from a predetermined register position from said logical one value set in said write shift register;

b) for each read operation shifting the values in read offset shift register by one register position; and c) asserting an ALMOST Full signal if said full signal is asserted or if any corresponding pair of register positions of said read offset shift register and said write shift register both have a logical one value.

10. The method as recited in claim 9 is further comprised of the steps of:

a) setting Y register positions in a write offset shift register having a plurality of positions to have logical one value starting from a predetermined register position from said logical one value set in said read shift register;

b) for each write operation shifting the values in write offset shift register by one register position; and c) asserting an ALMOST Empty signal if said empty signal is asserted or if any corresponding pair of register positions of said write offset shift register and said read shift register both have a logical one value.

11. The method as recited in claim 10 where Y=1.

12. A circuit for generating almost full and almost empty signals for a First In First Out (FIFO) controller, said FIFO controller for controlling a FIFO with X storage locations, said circuit comprising:

a) a write shift register having X register positions, said write shift register for tracking write operations of data into said memory device, said write shift register coupled to and triggered by a write clock;

b) a read shift register having X register positions, said read shift register for tracking read operations of data from said memory device, said read shift register coupled to and triggered by a read clock;

c) a read offset shift register having X register positions, said read offset shift register for tracking read operations from said memory device relative to said write shift register, said read offset shift register coupled to and triggered by said read clock;

d) a write offset shift register having X register positions, said write offset shift register for tracking write operations from said memory device relative to said read shift register, said write offset shift register coupled to and triggered by said write clock;

e) means for determining that corresponding register positions in said write shift register and said read offset shift registers both have a logical one value and asserting said almost full signal; and f) means for determining that corresponding register positions in said read shift register and said write shift registers both have a logical one value and asserting said almost empty signal.

13. The circuit as recited in claim 12 wherein said means for determining that corresponding registers in said write shift register and said read offset shift registers both have a logical one value and asserting said almost full signal is further comprised of:

a) means for generating a logical one signal along a first common line;

b) N-Channel means, each of said N-Channel means coupled to z corresponding outputs of said X register positions of said read offset shift register and said X register positions of said write shift register, each of said N-Channel means for converting said first common line to a logical zero value if any two corresponding outputs have a logical one value;

c) signal inversion means for inverting a signal on said first common line from a logical one to a logical zero or from a logical zero to a logical one; and d) means for asserting said almost full signal if said first common line has a logical one value.

14. The circuit as recited in claim 13 wherein said means for determining that corresponding registers in said write shift register and said read offset shift registers both have a logical one value and asserting said almost full signal is further comprised of:

a) means for generating a logical one signal along a second common line;

b) N-Channel means, each of said N-Channel means coupled to corresponding outputs of said X register positions of said write offset shift register and said X register positions of said read shift register, each of said N-Channel means for converting said second common line to a logical zero value if any two corresponding outputs have a logical one value;

c) signal inversion means for inverting a signal on said second common line from a logical one to a logical zero or from a logical zero to a logical one; and d) means for asserting said almost empty signal if said second common line has a logical one value.

15. The circuit as recited in claim 14 wherein N=2048.

16. A computer system comprising:

a plurality of computing nodes, each of said computing nodes coupled to a routing element;

a plurality of routing elements coupled to other of said plurality of routing elements, said plurality of routing elements for interconnecting each of said plurality of computing nodes; and each of said plurality of computing nodes comprised of a processor element and a buffer element, said processor element for processing data and said buffer element for managing the transfer of data between said processor element and said routing element;

said buffer element comprised of:

a memory means for storing data messages, said memory means having X locations for storing data messages;

a read shift register having X register positions, said read shift register for identifying the location in said memory means from which a next data message is to be read a write shift register having X register positions, said read shift register for identifying the location in said memory means into which a next data message is to be written;

flag signal generation means coupled to said read shift register and said write shift register, said flag signal generation means for generating a flag signal which indicates whether a boundary condition is occurring in said memory device;

a read toggle responsive to a read clock for indicating whether an even or odd number of boundary conditions in said memory device have occurred;

a write toggle responsive to a write clock for indicating whether an even or odd number of boundary conditions in said memory device have occurred;

full signal generation means coupled to said flag signal generation means, said read toggle and said write toggle, said full signal generation means for generating a signal that said memory means is full; and empty signal generation means coupled to said flag signal generation means said read toggle and said write toggle, said empty signal generation means for generating a signal that said memory means is empty.

17. The computer system as recited in claim 16 wherein said buffer element is further comprised of:

a) almost full signal generation means coupled to said full signal generation means and said write shift register, said almost full signal generation means for generating a signal that said memory device is almost full; and b) almost empty signal generation means coupled to said empty generation means and said read shift register, said almost empty signal generation means for generating a signal that said memory device is almost empty.

18. The computer system as recited in claim 17 wherein N=2048.

19. A circuit for generating flag signals for a First In First Out (FIFO) controller, said FIFO controller for controlling a FIFO with X storage locations, said circuit comprising::

a) a read shift register coupled to and triggered by a read clock, said read shift register having X registers, said read shift register for identifying locations in said memory means from which data messages are read;

c) a write shift register coupled to and triggered by a write clock, said write shift register having X registers, said write shift register for identifying locations in said memory means into which data messages are to be written;

d) a first flag signal generation means coupled to said read shift register and said write shift register, said first flag signal generation means for generating an empty signal which indicates said FIFO is empty on a rising edge of said read clock and is not empty on a falling edge of said write clock; and e) a second flag signal generation means coupled to said read shift register and said write shift register, said second flag signal generation means for generating a full signal which indicates said FIFO is full on a rising edge of said write clock and is not full on a falling edge of said read clock.

20. The circuit as recited in claim 19 wherein said first flag signal generation means is further comprised of:

means for generating a logical one signal along a first flag line;

N-Channel means, each of said N-Channel means coupled to corresponding outputs of said X registers of said read shift register and a write latch coupled to a register output of said write shift register, each of said N-Channel means for converting said first flag line to a logical zero value if each input to said N-Channel means has a logical one value;

said write latch for providing output of said write shift registers to said N-Channel means responsive to said write clock; and means for asserting said empty signal if said first flag line has a logical zero value and de-asserting said empty signal if said first flag line has a logical one value.

21. The circuit as recited in claim 20 wherein said second flag signal generation means is further comprised of:

means for generating a logical one signal along a second flag line;

N-Channel means, each of said N-Channel means coupled to corresponding outputs of said X registers of said write shift register and a read latch coupled to a register output of said read shift register, each of said N-Channel means for converting said second flag line to a logical zero value if each input to said N-Channel means has a logical one value;

said read latch for providing output of said read shift registers to said N-Channel means responsive to said read clock; and means for asserting said full signal if said second flag line has a logical zero value and de-asserting said full signal if said second flag line has a logical one value.

* * * * *

UNITED STATES PATENT AND TRADEMARK OFFICE
CERTIFICATE OF CORRECTION

PATENT NO.  :  5,473,756
DATED  :  December 5, 1995
INVENTOR(S)  :  Roger L. Traylor It is certified that error appears in the above-identified patent and that said Letters Patent is hereby corrected as shown below:

In column 5 at line 56 delete "older" and insert --order--

In column 6 at line 25 delete "0R" and insert --OR--

Signed and Sealed this

Thirty-first Day of December, 1996

*Attest:*

BRUCE LEHMAN

*Attesting Officer*   *Commissioner of Patents and Trademarks*